US007144069B2

(12) United States Patent
Meyer et al.

(10) Patent No.: US 7,144,069 B2
(45) Date of Patent: Dec. 5, 2006

(54) VEHICLE, IN PARTICULAR CAMPER, WITH A HYDRAULICALLY ACTUATED ROOF PART

(75) Inventors: Bernardus Martinus Emanuel Meyer, Overdinkel (NL); Haiko Freriksen, Hengelo (NL)

(73) Assignee: Actuant Corporation, Glendale, WI (US)

( * ) Notice: Subject to any disclaimer, the term of this patent is extended or adjusted under 35 U.S.C. 154(b) by 65 days.

(21) Appl. No.: 10/921,516

(22) Filed: Aug. 19, 2004

(65) Prior Publication Data

US 2005/0116499 A1 Jun. 2, 2005

(30) Foreign Application Priority Data

Aug. 22, 2003 (NL) .................................... 1024151

(51) Int. Cl.
*B60P 3/34* (2006.01)

(52) U.S. Cl. ...................................................... 296/156

(58) Field of Classification Search ................ 296/156, 296/163, 26.04, 26.06, 210
See application file for complete search history.

(56) References Cited

U.S. PATENT DOCUMENTS

| | | | | |
|---|---|---|---|---|
| 3,481,489 | A | 12/1969 | Stauffer | |
| 4,337,959 | A * | 7/1982 | Bettin et al. | 280/43.23 |
| 4,452,328 | A | 6/1984 | Oudelaar | |
| 6,173,737 | B1 * | 1/2001 | Saucier | 137/504 |
| 6,189,432 | B1 | 2/2001 | Colarelli et al. | |
| 6,583,525 | B1 * | 6/2003 | Dyer et al. | 310/53 |
| 6,655,723 | B1 | 12/2003 | Meijer et al. | |
| 6,932,403 | B1 | 8/2005 | Meijer et al. | |
| 2006/0021657 | A1 * | 2/2006 | Cherfane et al. | 137/504 |

FOREIGN PATENT DOCUMENTS

| | | | |
|---|---|---|---|
| DE | 1807911 | A | 7/1969 |
| DE | 4418776 | A1 | 12/1994 |
| DE | 10123790 | A1 | 12/2002 |
| EP | 0100589 | A1 | 2/1984 |

* cited by examiner

*Primary Examiner*—H Gutman
(74) *Attorney, Agent, or Firm*—Quarles & Brady LLP

(57) ABSTRACT

A hydraulic actuating device for a roof part which is moveable between a closed position and an open position of a vehicle has a first hydraulic actuator and a second hydraulic actuator, which first and second actuators are designed to drive the moveable roof part in a parallel arrangement. The first and second hydraulic actuators each have a housing in which there is a space in which a piston member is accommodated, dividing the space into an opening chamber and a closing chamber, each housing being provided with an opening connection and a closing connection, which are respectively in communication with the opening chamber and the closing chamber, so that when pressurized hydraulic fluid is simultaneously fed to the opening connections of the first and second hydraulic actuators the roof part moves towards the open position, and when pressurized hydraulic fluid is fed to the closing connections the roof part moves towards the closed position. The opening connections are in communication with at least one common flow-distributing valve, which also has a first line connected to it, via which first line and said valve pressurized hydraulic fluid can be fed from the pump to the first and second actuators during an opening movement of the roof part and via which first line and valve hydraulic fluid can flow out of the opening chambers in the event of a closing movement of the roof part.

9 Claims, 4 Drawing Sheets

VEHICLE, IN PARTICULAR CAMPER, WITH A HYDRAULICALLY ACTUATED ROOF PART

FIELD OF THE INVENTION

The invention relates to a hydraulic actuating device for a roof part, which is moveable between a closed position and an open position, of a vehicle, in particular of a camper. Furthermore, the invention relates to a vehicle provided with a hydraulically moveable roof part of this type.

BACKGROUND OF THE INVENTION

DE 101 23 790 has disclosed a camper with a roof part which can be moved hydraulically upwards. Moveable arm structures are arranged between the body and the roof part on the left-hand side and the right-hand side. Furthermore, a left-hand hydraulic cylinder and a right-hand hydraulic cylinder are provided, these cylinders each acting on an arm structure in order to move the roof part up and down. The raiseable roof part serves in particular to provide additional space in the camper.

The cylinders each have an opening connection and a closing connection, which are respectively in communication with the opening chamber and the closing chamber of the corresponding cylinder, so that when pressurized hydraulic fluid is simultaneously fed to the opening connections of the first and second hydraulic actuators the roof part moves towards the opening position, and when pressurized hydraulic fluid is simultaneously fed to the closing connections the roof part moves towards the closed position.

In particular in the case of campers, the roof part is sometimes moved while there is a load resting on it, for example a surfboard, ski box, etc. This load, in particular if the load is acting eccentrically on the roof part, in the case of the known vehicle gives rise to uneven movements of the roof part on the left-hand and right-hand sides, which in turn leads to undesirable mechanical loads on the arm structures.

OBJECT OF THE INVENTION

It is an object of the invention to provide an improved hydraulic actuating device for a vehicle roof part of this type, so that undesirable uneven movements are counteracted.

SUMMARY OF THE INVENTION

The invention provides a hydraulic actuating device which is characterized in that the opening connections are in communication with at least one common flow-distributing/combining valve, which also has a first line connected to it, via which first line and at least one valve pressurized hydraulic fluid can be fed from the pump to the first and second actuators during an opening movement of the roof part and via which first line and at least one valve hydraulic fluid can flow out of the opening chamber in the event of a closing movement of the roof part.

As will become apparent in more detail below, the device may have a single, common flow-distributing/combining valve or a plurality of valves, in particular two parallel valves.

In the case of a single, common flow-distributing/combining valve, the said valve—if one of the actuators needs to supply a greater force when opening the roof part than the other (in particular on account of an eccentric load acting on the roof part)—ensures that the same volumetric flow of hydraulic fluid is nevertheless supplied to both actuators, so that both actuators carry out the same movement and continue to move synchronously. The valve also ensures that the two actuators run synchronously when the roof part is being lowered, by enabling the same volumetric flow of hydraulic fluid to flow out of both opening chambers. In the case of two parallel valves, one valve can be responsible for synchronous running during an opening movement and the other can be responsible for synchronous running during a closing movement of the roof part.

Advantageous embodiments of the actuating device according to the invention are described in the claims and the following description with reference to the drawing.

DETAILED DESCRIPTION OF PREFERRED EMBODIMENTS

Figure 1:
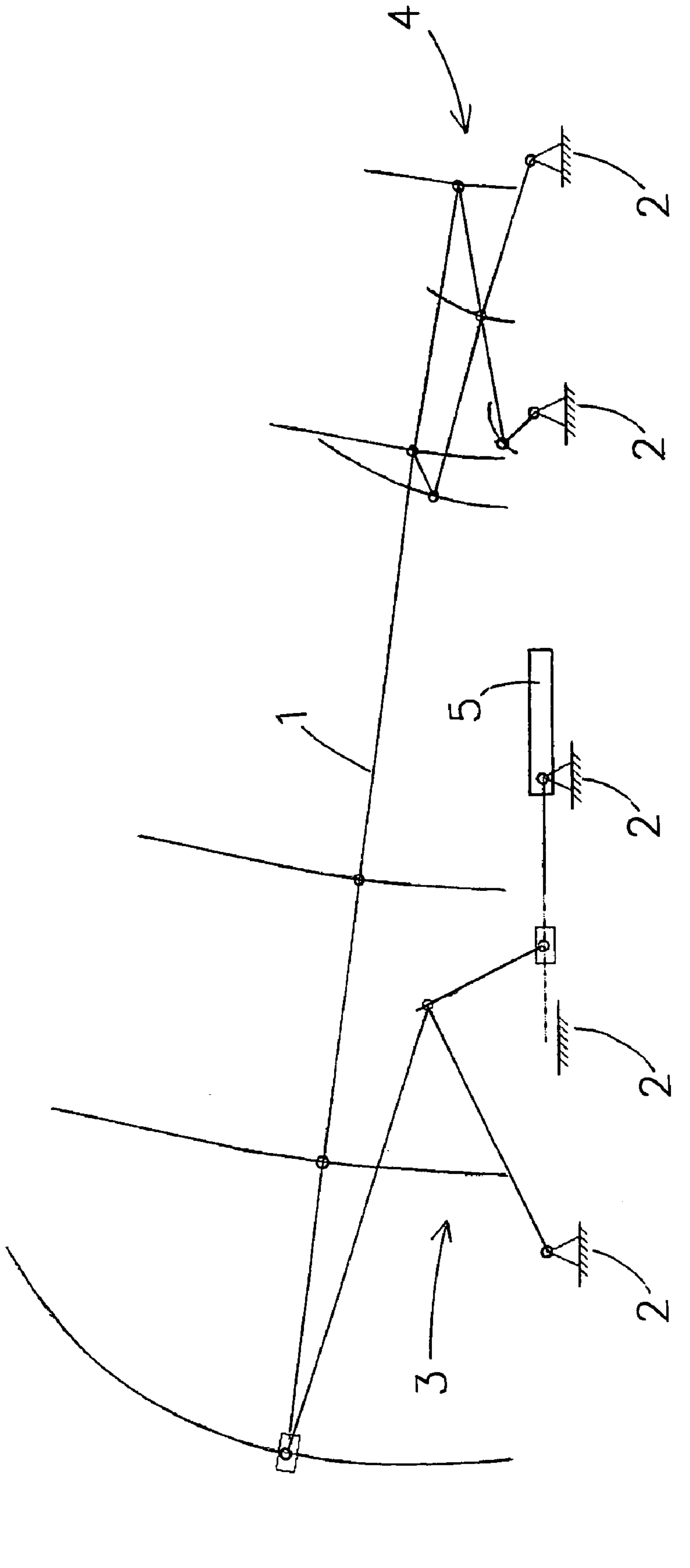
FIG. 1 diagrammatically depicts a side view of a raiseable roof part of a camper and the associated arm structures and hydraulic cylinders.

FIG. 1 shows a side view of a roof part 1, which can be moved between a closed position and an open position, of a vehicle (not shown), in particular a camper. Pivotable arm structures 3, 4 are arranged between the body 2 of the vehicle and the roof part 1—on the left-hand and right-hand sides of the vehicle—respectively in the vicinity of the front side and the rear side of the roof part 1.

At the front arm structure 3—on each side of the vehicle—there is a hydraulic cylinder 5, 5', so that the roof part 1 moves upwards as a result of the piston rod being extended. The upwards movement of the roof part 1, which, by way of example, forms part of a substantially flat roof of the camper, creates additional space. It is possible to provide a peripheral wall, for example composed of foldable panels or flexible material, around the raised roof part and the lower-lying part of the roof.

Figure 2:
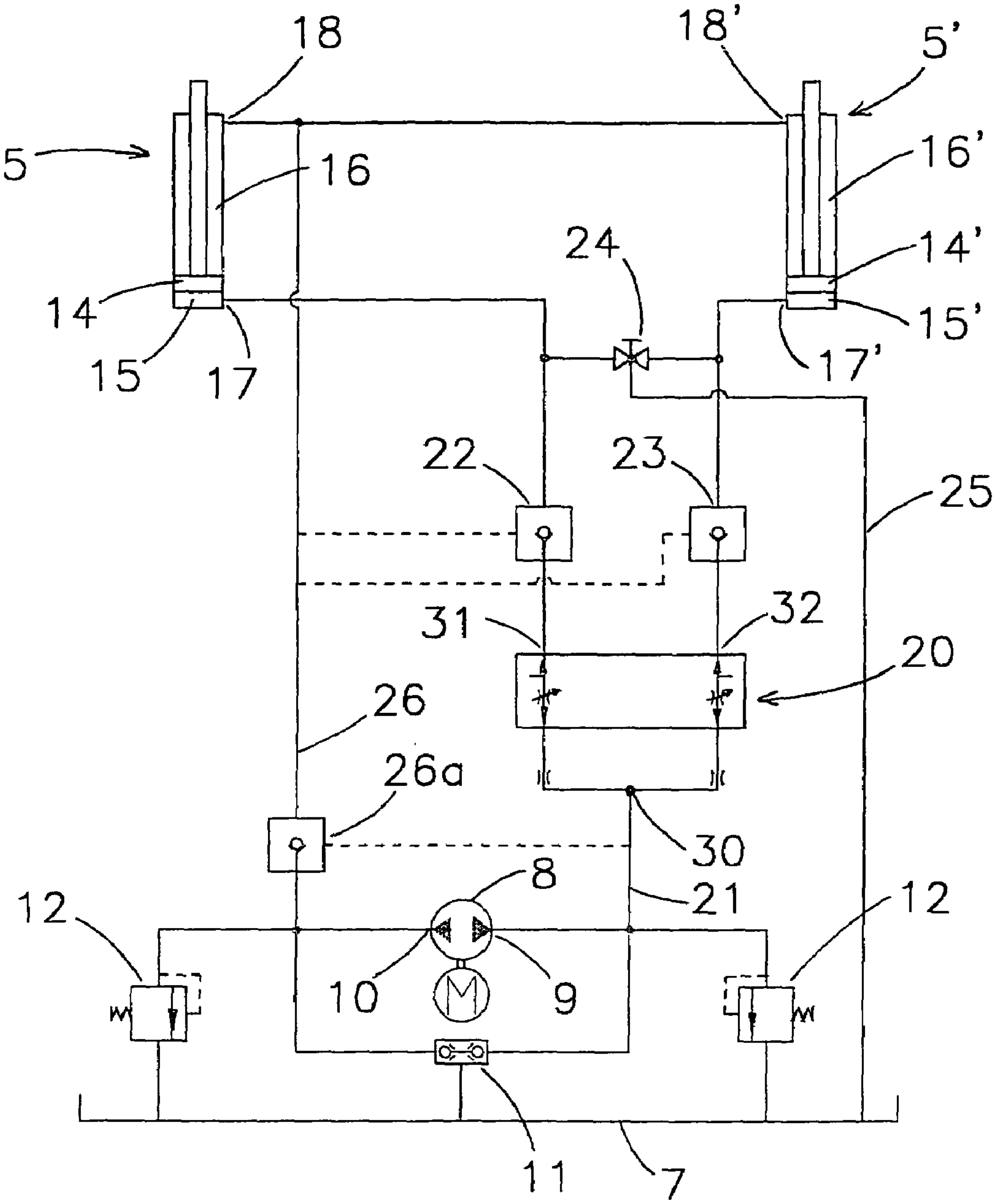
FIG. 2 shows a preferred embodiment of the hydraulic circuit diagram of the actuating device according to the invention, FIG. 3 diagrammatically depicts a preferred embodiment of the common flow-distributing/combining valve.

The circuit diagram shown in FIG. 2 illustrates a hydraulic actuating device according to the invention, in which the cylinders 5 and 5' are incorporated. This actuating device comprises a reservoir 7 for hydraulic fluid, an electrically driven reversible pump 8 with a first port 9 and a second port 10, which act as pressure port or suction port depending on the operating state of the pump.

The first and second ports 9, 10 are in communication with the reservoir 7 via a suction diverter valve 11. Furthermore, each port 9, 10 has an associated pressure-relief valve 12.

As can be seen from FIG. 2, the first and second cylinders 5, 5' each have a housing in which there is a space accommodating a piston member 14, 14' which divides the space into an opening chamber 15, 15' and a closing chamber 16, 16'.

Each housing is provided with an opening connection 17, 17' and a closing connection 18, 18', which are respectively in communication with the opening chamber and the closing chamber, so that when pressurized hydraulic fluid is simultaneously fed to the opening connections of the first and second cylinders 5, 5', the roof part 1 shown in FIG. 1 moves towards the open position, and when pressurized hydraulic fluid is simultaneously fed to the closing connections the roof part moves towards the closed position.

The opening connections 17, 17' are in communication with a common flow-distributing/combining valve 20, to which, furthermore, a first line 21 is connected, via which first line 21 and valve 20 pressurized hydraulic fluid can be fed from the first port 9 of the pump 8 to the first and second cylinders 5, 5' during an opening movement of the roof part and via which first line 21 and valve 20 hydraulic fluid can flow out of the opening chamber 15, 15' during a closing movement of the roof part 1.

The second port 10 is in communication with the closing connections 18, 18' of the first and second cylinders 5, 5' via a line 26.

Between the flow-distributing/combining valve 20 and each opening connection 17, 17' there is incorporated a hydraulically actuable nonreturn valve 22, 23 which closes in the direction towards the flow-distributing/combining valve 20.

For emergency operation, a valve 24, in this example a manually actuated valve 24, is accommodated in a line 25 between the connections 17 and 17' and the reservoir 7.

In the line 26 there is accommodated a hydraulically actuable nonreturn valve 26*a*, which closes in the direction of the pump port 10 and opens when the pressure in the line 21 is sufficient.

Figure 3:
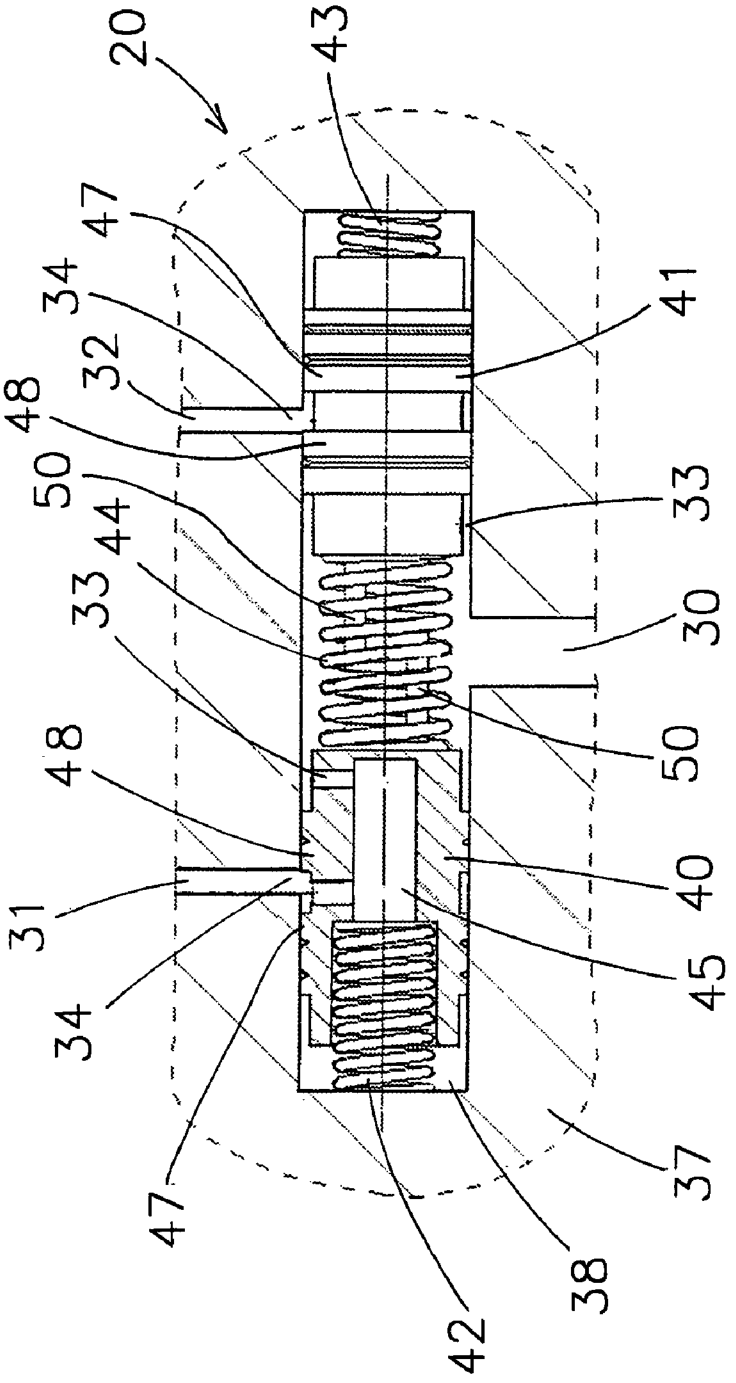

It can be seen from FIG. 3 that the flow-distributing/combining valve 20 is of the type having a main connection 30 for the line 21 and two working connections 31, 32 leading to the hydraulic cylinders 5, 5', a flow path being present from the main connection 30 to each of the working connections 31, 32, and the valve 20 forming a fixed throttle (at 33) and a controllable throttle (at 34) in each flow path, as seen from the main connection 30 to the working connection 31, 32.

In particular, the flow-distributing/combining valve 20 has a housing 37 with a bore 38, to which the main connection 30 is centrally connected and to which the working connections 31, 32 are connected on either side of the main connection.

A first and a second piston 40, 41, which are substantially identical, are accommodated displaceably in the bore 38, between the main connection 30 and each of the working connections 31, 32, respectively.

A first spring 42, which applies a load to the first piston in the direction towards the second piston, is present between the housing 37 and the first piston 40.

A second spring 43, which applies a load to the second piston 41 in the direction towards the first piston, is present between the housing 37 and the second piston 41.

A third spring 44 is present between the first and second pistons 40, 41, applying a load forcing the first and second pistons away from one another.

In each piston 40, 41 there is provided a passage 45 with a fixed throttle (at 33), which passage 45 is in communication with the main connection 30 and which passage 45 is in communication, via a throttling opening (at 34) which can be varied as a function of the position of the piston, with the working connection 31, 32. As can be seen, each passage 45 is also in communication with the space in which the spring 42, 43 is accommodated.

Each piston 40, 41 of the flow-distributing/combining valve 20 has two control edges 47, 48 which are located next to and at a distance from one another and can cover the working connection 31, 32 depending on the position of the piston, between which control edges the passage 45 of the said piston opens out into a recessed groove.

At their ends which face one another, the pistons 40, 41 are provided with coupling members 50, which are designed in such a manner that the pistons 40, 41 can be displaced freely with respect to one another within a defined range.

The valve 20 ensures that in the event of a differing load on one hydraulic cylinder compared to the other hydraulic cylinder, in particular resulting from a load placed on the roof part, for example a surfboard, the volumetric flows to or from the two opening chambers of the hydraulic cylinders are accurately kept equal to one another, so that the cylinders 5, 5' continue to move synchronously.

If the load acting on both cylinders 5, 5' is equal and the cylinders 5, 5' are being extended, the pistons 40, 41 are in the position shown in FIG. 3. In the event of the load on cylinder 5 being greater than the load on cylinder 5', the volumetric flow to the cylinder 5 will in the first instance be lower than the volumetric flow to cylinder 5'. This leads to a lower pressure drop across the throttle 33 in piston 40 than across the throttle 33 in piston 41. As a result, the pump pressure forces the piston 40 towards the right in FIG. 3, so that the throttling opening 34 of the working connection 32 decreases in size, and therefore a smaller volumetric flow passes to the cylinder 5'. In this way, the valve 20 seeks to continuously keep the volumetric flows equal. When the cylinders 5, 5' are being retracted, the valve 20 acts in a similar way.

Figure 4:
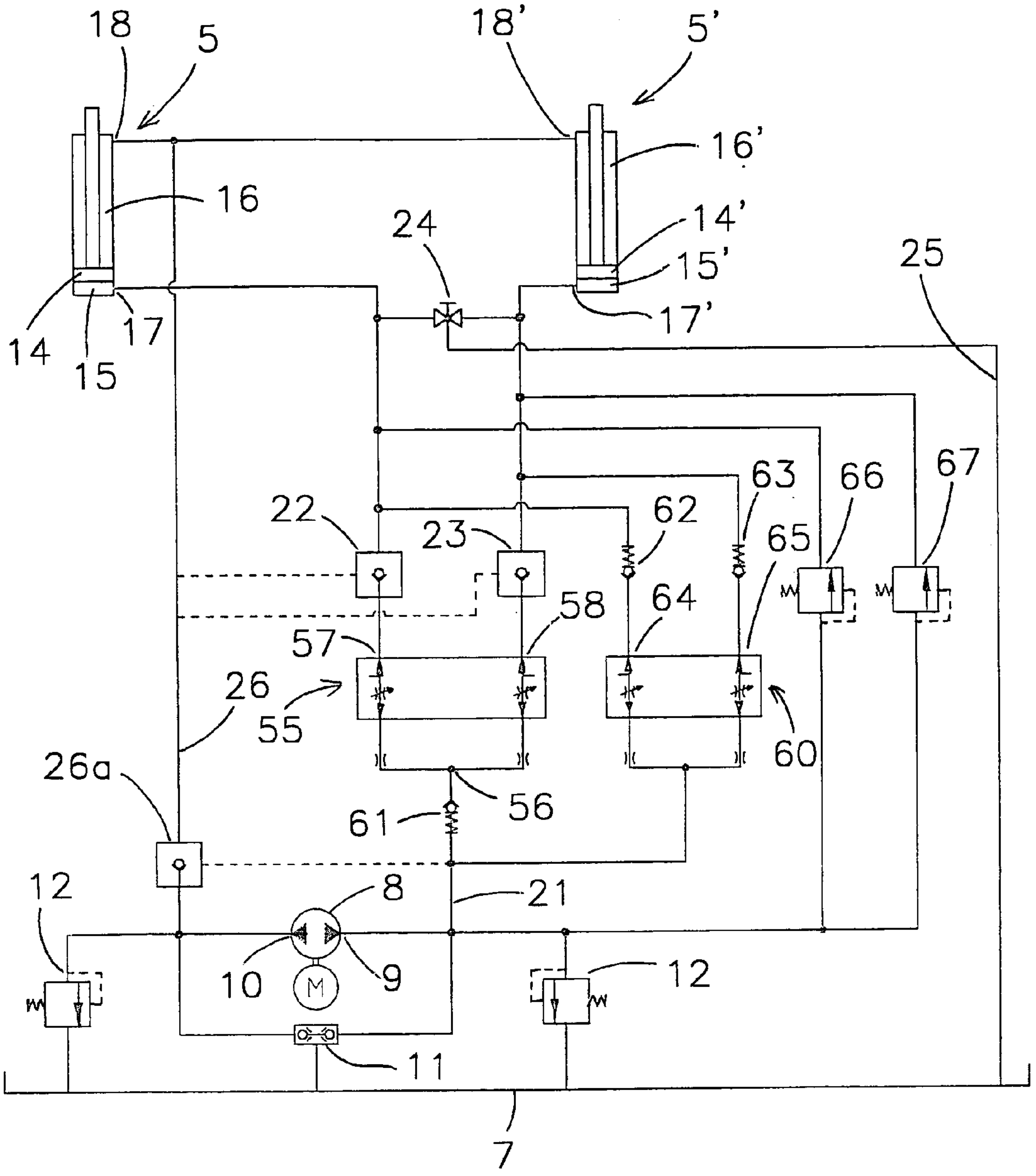
FIG. 4 shows a hydraulic circuit diagram of an alternative embodiment of the actuating device according to the invention.

FIG. 4 shows a hydraulic circuit diagram of an alternative embodiment of the actuating device according to the invention. Components which correspond to components from the circuit diagram shown in FIG. 2 are provided with the same reference numerals and their action is not explained once again, or is only explained briefly.

The embodiment shown in FIG. 4 is intended in particular for applications in which the loading of the cylinders produces a much greater pressure in the opening chambers of these cylinders, for example as a result of the weight of the roof part and/or the kinematic situation.

FIG. 4 shows the pump 8, the ports 9, 10 and the hydraulic cylinders 5 and 5'. In this case, there is not a single flow-distributing/combining valve accommodated in the line 21 between the port 9, on the one hand, and the connections 17 and 17', on the other hand (as in FIG. 2), but rather two valves of this type are accommodated in parallel in the line 21. These valves are denoted by 55 and 60.

A nonreturn valve 61 at the main connection 56 of the valve 55 is such that the valve 61 permits a return flow from the cylinders 5, 5' through the valve 55. Nonreturn valves 62 and 63 between the working connections 64 and 65 of the valve 60 and the opening connections 17, 17' are such that these valves 62, 63 prevent a return flow from the cylinders 5, 5' through the valve 60. Therefore, valve 60 is active when fluid is being supplied to the cylinders 5, 5' (i.e. when the roof part is being opened), and valve 55 is active when fluid is flowing out of the cylinders 5, 5' (closing of the roof part).

It is preferable for the valves 55 and 60 to be specifically adapted to their function. In one possible embodiment, both valves 55, 60 are based on the design which has been explained in detail with reference to FIG. 3. In this case, it is provided that the two pistons of the valve are secured to one another to form a single assembly, thereby forming a single piston body, with the abovementioned third spring being absent.

As an additional measure, FIG. 4 also shows pressure-relief valves 66, 67, which are respectively accommodated between the port 9 of the pump and the port 17 and port 17', in parallel with the valves 55 and 60. These valves 66, 67 open in the event of a defined, identical pressure level, which is slightly lower than that of the pressure-relief valves 12 determining the system pressure, being exceeded. This is desirable, for example, if one of the cylinders 5, 5' should nevertheless reach its extended position earlier than the other. The valve 60 will then reduce the volumetric flow to the said other cylinder, since the volumetric flow to the fully extended cylinder has already dropped to zero. The result of such a situation is that the other cylinder would then be fed only by the leakage flow through the valve 60, which takes an undesirably long time. However, an additional effect is the increase in pressure in the line 21 in this situation. This increase in pressure causes the valves 66, 67 to open, so that the other cylinder is still fully extended along one of these paths. It will be clear that the presence of the pressure-relief valves 66, 67 is related to the design of the valves 55, 60.

What is claimed is:

1. A hydraulic actuating device for a roof part, which is moveable between a closed position and an open position of a vehicle, comprising:

a reservoir for hydraulic fluid, a pump for delivering pressurized hydraulic fluid, a first hydraulic actuator and a second hydraulic actuator, which first and second actuators are designed to drive the moveable roof part in a parallel arrangement, the first and second hydraulic actuators each having a housing in which there is a space in which a piston member is accommodated, dividing the space into an opening chamber and a closing chamber, each housing being provided with an opening connection and a closing connection, which are respectively in communication with the opening chamber and the closing chamber, so that when pressurized hydraulic fluid is simultaneously fed to the opening connections of the first and second hydraulic actuators the roof part moves towards the open position, and when pressurized hydraulic fluid is fed to the closing connections the roof part moves towards the closed position, characterized in that the opening connections are in communication with at least one common flow-distributing valve, which also has a first line connected thereto, via which first line and said at least one valve pressurized hydraulic fluid can be fed from the pump to the first and second actuators during an opening movement of the roof part and via which first line and said at least one valve hydraulic fluid can flow out of the opening chambers in the event of a closing movement of the roof part.

2. An actuating device according to claim 1, in which the at least one flow-distributing valve has a main connection for the first line and two working connections leading to the hydraulic actuators, a flow path being provided from the main connection to each of the working connections, and the valve forming a fixed throttle and a controllable throttle in each flow path, from the main connection to the working connection.

3. An actuating device according to claim 2, in which the at least one flow-distributing valve has a housing with a bore, to which the main connection is centrally connected and to which the working connections are connected on either side of the main connection, a first and a second piston respectively being displaceably accommodated in the bore between the main connection and each of the working connections, a first spring, which applies a load on the first piston in the direction of the second piston being present between the housing and the first piston, arid a second spring, which applies a load to the second piston in the direction of the first piston, being present between the housing and the second piston, and a third spring being present between the first and second pistons, applying a load forcing the first and second pistons away from one another, a passage with a fixed throttle being provided in each of said first and second pistons, which passage is in communication with the main connection and which passage is in communication with the working connection via a throttling opening which can be varied as a function of the position of the associated piston.

4. An actuating device according to claim 3, in which each piston of the flow-distributing valve has two control edges which are located next to and at a distance from one another and can cover the working connection as a function of the position of the associated piston, between which control edges the passage opens out.

5. An actuating device according to claim 1, in which the pump is a reversible pump having a first port and a second port, which act as pressure port or suction port depending on the operating state of the pump, and in which the first line having the at least one flow-distributing valve is connected to the first port, and in which the second port is in communication with the closing connections of the first and second actuators.

6. Actuating device according to claim 1, in which a hydraulically actuable nonreturn valve is accommodated between a flow-distributing valve and each opening connection, which nonreturn valve closes in the direction towards the flow-distributing valve.

7. An actuating device according to claim 1, in which two flow-distributing valves which are arranged in parallel are provided between the pump and the opening connections, nonreturn valves also being provided, in such a manner that one valve is active when fluid is supplied to the opening connections and the other valve is active when fluid flows back out of the opening connections.

8. An actuating device according to claim 7, in which pressure-relief valves are arranged between the pump and each of the opening connections, in parallel with the flow distributing valves.

9. A vehicle with a roof part which can move between a closed position and an open position in which a hydraulic actuating device according to claim 1 is provided.

* * * * *